United States Patent [19]

Reed

[11] 4,081,378

[45] Mar. 28, 1978

[54] LIQUID AERATION TO REDUCE BIOLOGICAL OXYGEN DEMAND

[75] Inventor: Robert D. Reed, Tulsa, Okla.

[73] Assignee: John Zink Company, Tulsa, Okla.

[21] Appl. No.: 759,915

[22] Filed: Jan. 17, 1977

[51] Int. Cl.$^2$ .......................... C02B 1/02; C02C 1/12
[52] U.S. Cl. .................................. 210/177; 210/180; 210/181; 210/194; 210/220
[58] Field of Search .................. 210/220, 221 R, 194, 210/177, 180, 181; 261/115, 116, 117, 118, 77

[56] References Cited

U.S. PATENT DOCUMENTS

| | | | |
|---|---|---|---|
| 967,135 | 8/1910 | Lachance | 261/118 |
| 2,318,463 | 5/1943 | Bussmann | 261/77 X |
| 2,474,833 | 7/1949 | Eweson | 71/9 |
| 2,616,676 | 11/1952 | Walker | 210/220 X |
| 2,741,327 | 4/1956 | Hedrich et al. | 261/118 X |
| 2,786,025 | 3/1957 | Lamb et al. | 210/181 X |
| 3,246,885 | 4/1966 | Stevens | 210/221 P X |
| 3,425,059 | 1/1969 | Babington | 261/116 X |
| 3,630,498 | 12/1971 | Bielinski | 210/220 X |
| 3,759,669 | 9/1973 | Aaron et al. | 261/77 X |

Primary Examiner—Charles N. Hart
Assistant Examiner—Robert H. Spitzer
Attorney, Agent, or Firm—Head, Johnson & Chafin

[57] ABSTRACT

Apparatus for aeration of water for reduction of the biological oxygen demand, which comprises a cylindrical vessel with vertical axis of selected cross-sectional area and height. A horizontal dividing wall is positioned near the bottom of the vessel. Water enters into the space below the dividing wall and passes upwardly through a plurality of narrow slots spaced equally from each other. An air manifold is provided including a plurality of small diameter pipes, or arms, each of which is positioned over one of the slots in the dividing wall. A plurality of small diameter orifices are drilled on the underside of the arms, divided substantially equally on each side of the center line, so that as the water rises it is immediately contacted by the air bubbles, which issue through these orifices. The air bubbles and liquid would rise in a column above the arms. Near the top of the chamber is a horizontal baffle plate, which has an annular space between its outer circumference and the inner wall of the tank. The air and water flow through the annular space, and radially inwardly, where the air disengages from the liquid, and flows upwardly through an axial pipe, while the liquid flows downwardly through an axial pipe.

12 Claims, 5 Drawing Figures

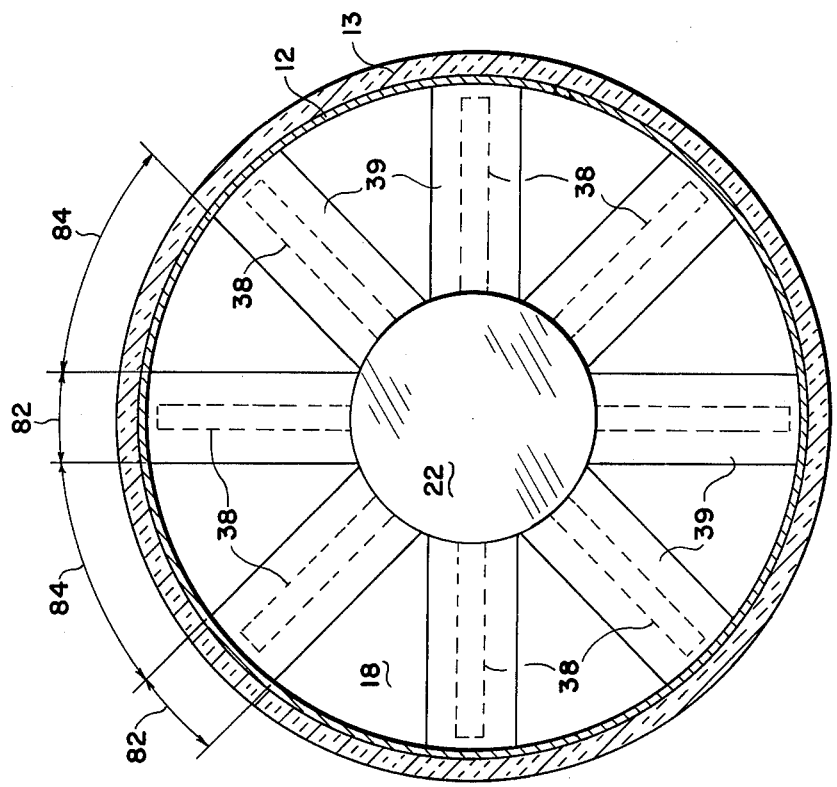
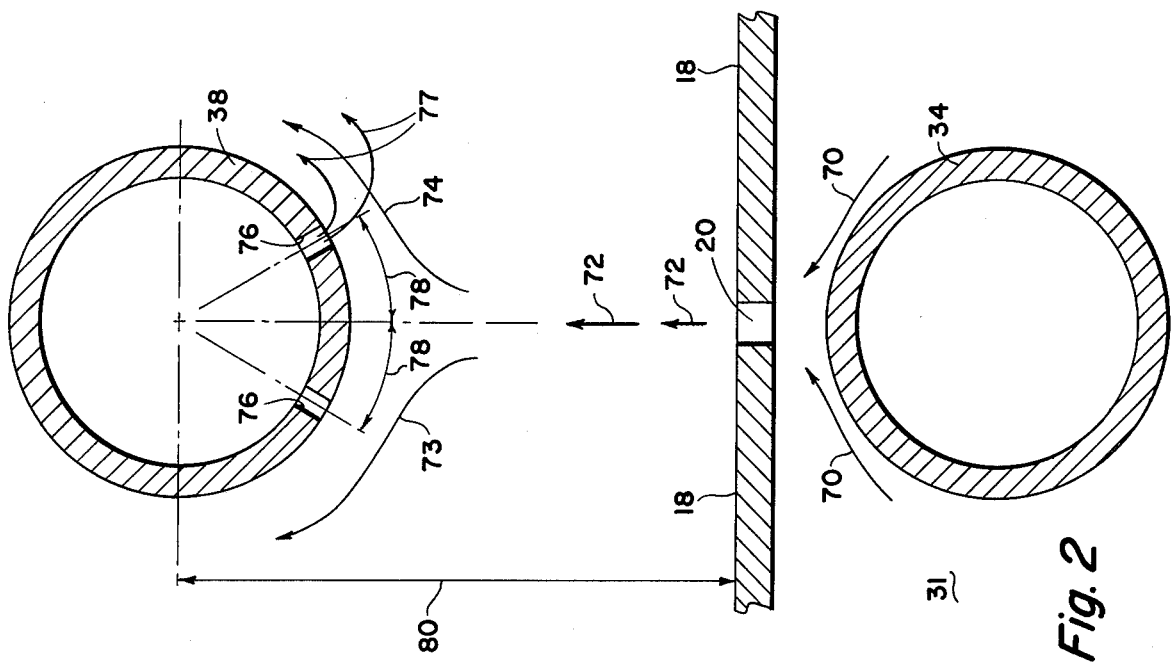

LIQUID AERATION TO REDUCE BIOLOGICAL OXYGEN DEMAND

BACKGROUND OF THE INVENTION

1. Field of the Invention

This invention lies in the field of liquid treatment systems. More particularly, it concerns the treatment of waste water with air, in order to improve the biological oxygen demand. Still more particularly it comprises an apparatus for efficiently aerating a liquid such as water to supply the biological oxygen demand.

2. Description of the Prior Art

It is common today to find liquids which are produced in quantity to be unsuited for discharge to commonly found waterways because of the biological oxygen demand for the organic material contained in the liquids. These effluent streams may be products of sewage treatment, typically, or they may result from certain chemical processes. It is vitally necessary for these effluent streams to be processed for reduction in biological oxygen demand before they can be vented to waterways in order to avoid very serious pollution of the waterways. It is common, today, to find reduction of biological oxygen demand (BOD) through aeration of the liquid effluents where air is caused to bubble upwardly through the liquids so that the oxygen content of the air can supply the BOD for the liquid so that the BOD can be satisfactorily supplied before the liquid, which is aqueous in nature, is released to a commonly-found waterway as a required disposal means.

Because the air is bubbled upwardly through the liquid, the oxygen of the air becomes available to the liquid at the surface of each bubble. Because the air is forced into the liquid at some depth within the liquid, the bubbles as formed are subjected to the pressure (statichead) of the liquid head and are small as formed at full liquid depth. But as buoyancy forces the bubble to rise, the size of the bubbles increases with rise. Therefore, the greater the number of bubbles formed as air enters the liquid, the better the air-liquid contact, which result in greater oxygen delivery to the liquid within a fixed time period, which can be defined as the time period during which liquid is exposed to air within the aeration vessel, or the time interval from liquid entry to the vessel to exit from the vessel.

Numerous devices have been constructed in the prior art for contacting a liquid with air, such as bubbling air up through a tank water or creating a spray of liquid into the air, and so on. All of these have limitations such as the residence time required to get the required amount of oxygen into the liquid, or the expense of energy for the processing of the liquid, and so on.

SUMMARY OF THE INVENTION

It is the primary object of this invention to provide an efficient simple system for aerating a liquid at minimum cost, and at maximum rate of liquid delivery.

This and other objects are realized and the limitations of the prior art are overcome in this invention by providing a tank or vessel into which liquid is supplied at a controlled rate and temperature, through a pipe at the base of the vessel. There is a horizontal dividing wall near the bottom of the vessel with a plurality of narrow slots spaced from each other, through which all of the water must pass in the form of vertical sheets of liquid.

An air manifold is connected to a plurality of tubes, pipes, or arms, with each pipe positioned directly above one of the slots in the dividing wall, at a selected spacing above the wall. A plurality of small diameter holes, openings or orifices are drilled in the bottom surface of the arms, in lines, at a selected angle on each side of the center line of the bottom surface. The position of the orifices is symmetrical with respect to the center line of the rising sheet of the liquid, which is immediately contacted by the air bubbles which issue from the arms.

A column of liquid plus bubbles rises directly above each of the arms, and moves toward the top of the vessel. A horizontal baffle plate is provided near the top of the vessel, which forces the liquid and air bubbles to pass through an annular space between the outer circumference of the baffle and the inner surface of the vessel. The water and air bubbles then move radially inward, the bubbles are disengaged from this relatively thin sheet of water, and the liquid is drained through an axial pipe downwardly through the baffle and out through the side of the vessel. Means are provided to heat either or both the air and liquid, so as to maintain a selected temperature in the vessel. The outer surface of the vessel is thermally insulated.

BRIEF DESCRIPTION OF THE DRAWINGS

These and other objects and advantages of this invention and a better understanding of the principles and details of the invention will be evident from the following description taken in conjunction with the appended drawings in which;

FIG. 2 illustrates a detail of the apparatus of FIG. 1, taken along the plane 2—2.

FIG. 5 illustrates further detail of the apparatus of FIG. 1 taken along the plane 5—5.

DESCRIPTION OF THE PREFERRED EMBODIMENT

Figure 1:
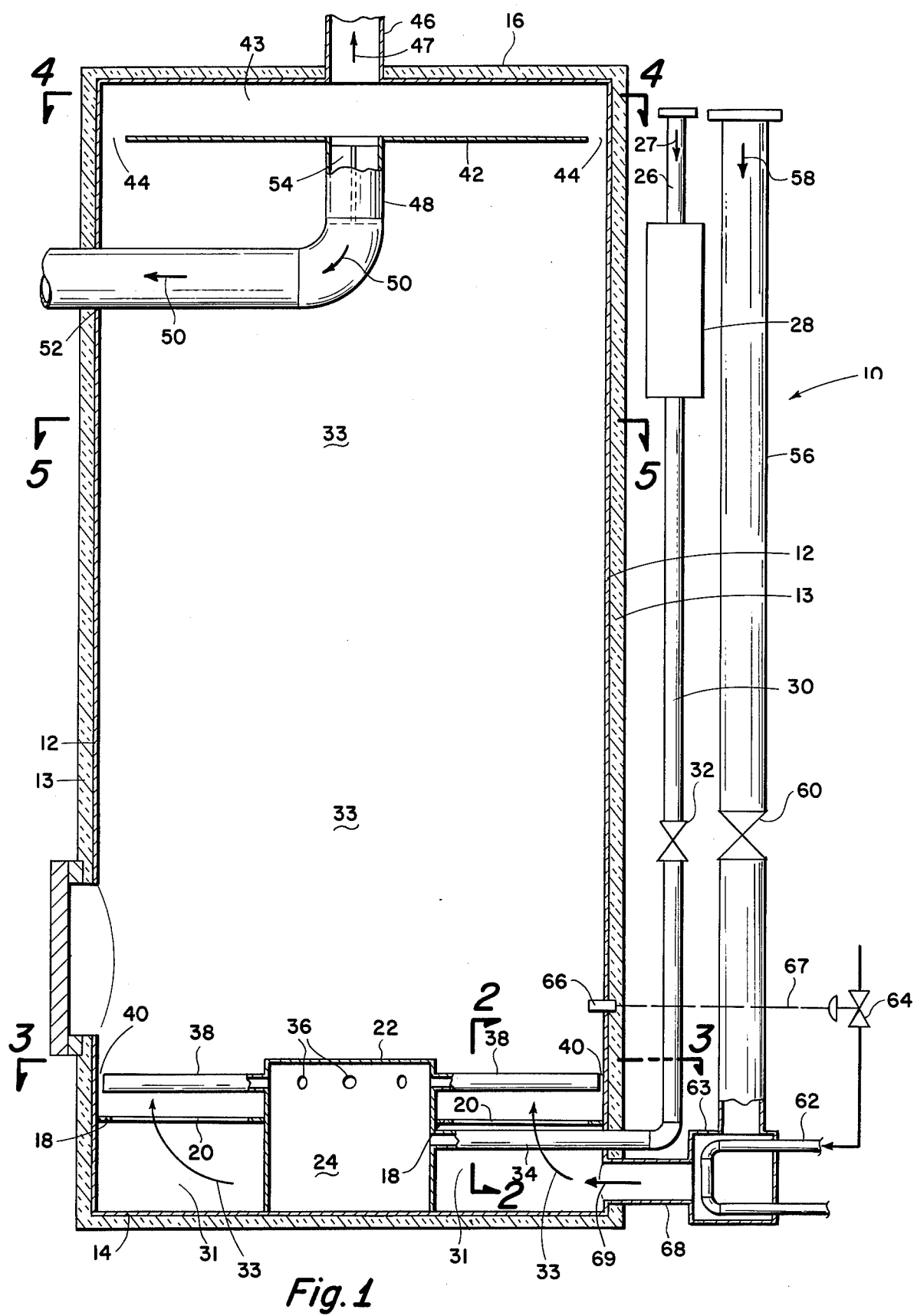
FIG. 1 represents in vertical cross-section, one embodiment of this invention.

Referring now to the drawings, and in particular to FIG. 1, there is shown one embodiment of the invention, which is indicated generally by the numeral 10. It comprises a tank or vessel 12 of cylindrical shape. The cross-sectional contour can either be circular, square or any desired shape, although a circular cylindrical vessel is preferred.

Any liquid and any gas can be utilized in this invention, although the greatest need appears to be for the aeration of water and the apparatus will be described in terms of an air and water system, simply for convenience, and without limitation.

Water to be treated by aeration enters through a pipe 56 in accordance with arrow 58 through a control valve 60, and into a heat exchanger 63, having heating coil 62 controlled by valve 64. The water heated in the heat exchanger 63 travels by pipe 68 in accordance with arrow 69 into a space 31 between a bottom 14 of the vessel and a horizontal baffle plate 18 spaced a selected distance above the bottom. There are a plurality of radial slots 20 as shown in detail in FIG. 2 which are quite narrow, of the order of ¼ inch, through which the water flows from the first space 31 up through the slots 20 in accordance with arrows 33, into the space 33 above the plate 18.

Figure 3:
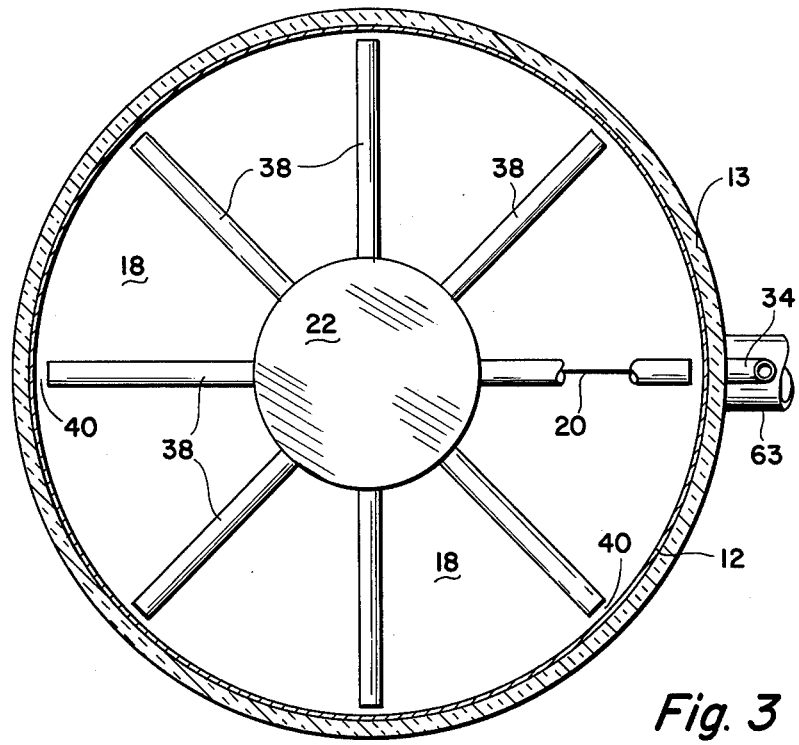
FIG. 3 illustrates a detail of the apparatus of FIG. 1 taken along the plane 3—3.

As shown in FIGS. 2 and 3, immediately above the slots 20, are a plurality of tubes, pipes, or arms 38 which project radially from a circular manifold 22 coaxial with the vessel 12. Air enters the vessel through a pipe 26 in accordance with arrow 27 and may utilize an air heater 28, as required, which delivers warmed air through pipe 30, valve 32, and through pipe 34 into the air manifold 22. The plenum 24 inside the manifold 22 is filled with air which is delivered through openings 36 near the top of the manifold and into the pipes or arms 38.

The center lines of the pipes 38 are directly above and coplanar with the slots 20. There are a plurality of small orifices 76 drilled in the under surface of the pipes 38. These are drilled at a selected angle 78 on each side of the center line 74. There should be at least four orifices per arm. The larger the number of orifices, and the smaller their corresponding diameters, the more effective the aeration, since a larger number of small bubbles will be formed which provides a greater contact area between the air in the bubbles and the water. As many as 50 - 100 or more small orifices can be provided.

Referring to FIG. 2, the water moves from the space 31 upwardly through the slot in accordance with arrows 70 and 72 and then divides in accordance with arrows 73 around the arms 38. The air bubbles issuing from the orifices 76 pass into the sheet of water flowing around the arms 38 and thoroughly mix with sheets of water, in accordance with arrows 77.

Referring now to FIG. 5, there is shown a view of the vessel 12 taken along the plane 5—5. It will be clear that above each of the pipes 38 there will be a rising column 39 of water and gas bubbles of width 82. This water in the columns rises for two reasons. The first is that there is a continual inflow of water at the bottom of the vessel, and an outflow at the top causing a certain minimum velocity of upward flow. In addition, the presence of the air bubbles in the liquid in effect reduces the density of the water-plus-air and causes that column of reduced density to rise more rapidly than the average flow of liquid, up to the baffle plate 42, which is positioned near the top 16 of the tank. Because of these rapidly rising columns 39 of air plus water, there will be a corresponding downward flow of water, after being freed of air, in the triangular spaces 84 in between the radial columns 39. Also there will be a downflow column of water over the axial manifold 22.

Expressing this another way, if liquid entry is such as to cause rise of liquid level within the vessel at one foot per minute, and the vessel is 25 feet high, the time interval for liquid within the vessel, from entry to exit, is 25 minutes. But the speed with which the buoyant bubbles rise in the liquid, after the vessel is full, is much greater than the speed of liquid rise within the vessel and is, quite reasonably, as great as 20 feet per minute; also, as the bubbles rise, they cause rise of water in the areas 39 of bubble rise. This demands areas of downward movement of liquid after disengagement from the bubbles at the top of the vessel.

Space for downward liquid travel are the triangular spaces 84, which should have at least 1.3 x area for upward travel 39. It is preferred also that there be a center area for downward liquid travel above the central manifold 22. Ample liquid recirculation is thus assured for many-times repeated air-liquid contact.

Thus the action of fully mixing the small air bubbles with the liquid provides a longer residence time of the water, for contact with air due to the upward and downward flow of water, until finally the air and water pass through the annular space 44 around the outer edge of the baffle 42 into the space 43 between the baffle and the top 16 of the tank. There is an axial pipe 46 which rises vertically through the top 16 of the tank, and a corresponding axial pipe 48 which passes downwardly through the baffle 42 and after a turn passes out through the wall of the tank at the point 52.

The passage of the liquid and air bubbles in a relatively thin sheet in the above space 43 above the baffle 42, radially inwardly, causes a disengagement of the air bubbles, which pass upwardly through the pipe 46, in accordance with arrow 47, while the liquid passes downwardly through the pipe 48 in accordance with arrows 50.

Figure 4:
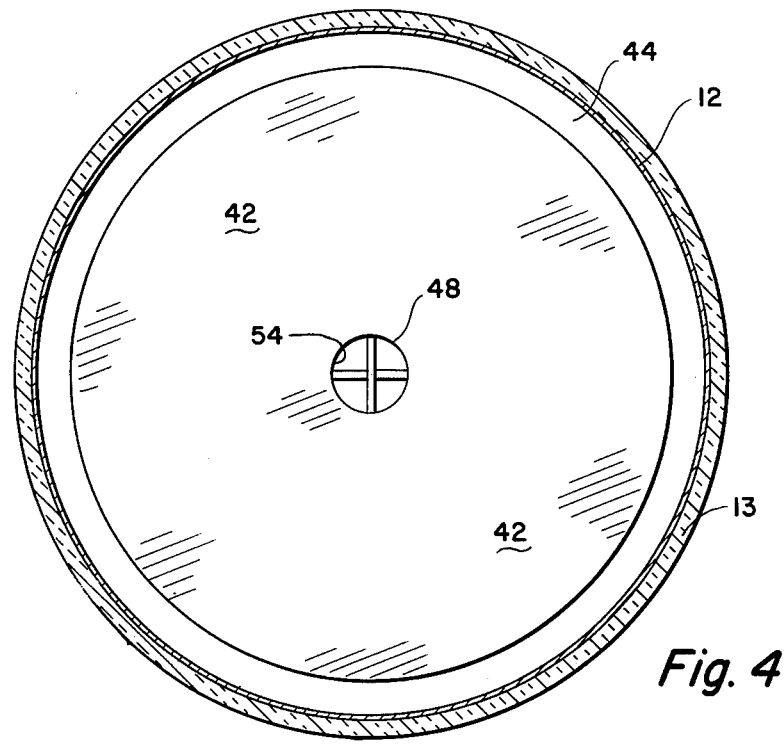
FIG. 4 illustrates further detail of the apparatus of FIG. 1 taken along plane 4—4.

It may be desirable to install one or more longitudinal plates to act as a vortex breaker 54 in the pipe 48. This is shown in FIG. 4 which is taken across the plane 4—4 of FIG. 1, showing the pipe 48, the vortex breaker 54 and the baffle plate 42 with the annular space 44.

FIG. 3 shows further detail of the arrangement of radial slots 20 in the plate 18 which are covered by radial arms 38 from a central manifold 22 through which air is applied to orifices in the bottom surfaces of the arms.

It has been found that the central manifold 22 should have a cross-sectional area of at least one percent, and preferably more, of the cross-sectional area of the vessel 12.

An important feature of this invention lies in the manner in which the water and air are contacted, providing for a great number of very small bubbles formed immediately in contact with a thin moving sheet of water. This is accomplished by passing water upwardly through a plurality of narrow slots directly toward an arm immediately above the slots. Air is supplied under pressure to a plurality of orifices which are drilled in lines longitudinal of the arms in two rows one on each side of the center line of the pipe at a selected angle such as 30°. The orifices lie within an area of less than 18% of the surface area of the pipe.

At departure from the orifices 76, the bubbles will be smaller than at the top of the vessel because, on departure from the orifices, the bubble is under greater pressure than at the top. It is under pressure due to the static-head of liquid. If the liquid is water, and the depth is 25 feet, the pressure would be about 11# gauge (25# Absolute), and the bubble volume at the orifices would be about 0.57 of its volume at the top. This is, of course advantageous in promotion of air-liquid contact, but it is also true that if there are smaller bubbles, the number of bubbles is greater for the same total air volume.

Another important feature of the invention lies in the horizontal spacing between the arms which permit a plurality of rising columns 39 of width 82, of water and minute air bubbles, which rise through the body of liquid. The air disengages at the top, and the water re-circulates downwardly through corresponding sectors 84, so that there is a longer residence time for contact of the liquid with air.

The valves 32 and 60 are provided for control of the rate of flow of air and water as required. The reaction between the air and the organic matter thay may be in the water, is a chemical reaction and its rate is sensitive to the temperature of the water. It has been found that a temperature of 60° F. is about the minimum temperature at which it is economical to provide aeration in this type of vessel. If the temperature should drop to 42° F., the reaction speed will be cut in half and the residence time required will be twice as great. On the other hand, if the temperature is raised to 80° F., the reaction rate can be doubled, and therefore the throughput of water through the vessel can be increased or the size of the vessel can be decreased, etc.

The valve 64 which controls the heating liquid through the pipe 62 to the heat exchanger 63 is controlled by a thermostat 66 in the wall of the vessel, which controls the valve 64 by means shown by the dashed line 67, as is well known in the art. The heating medium of course can be steam or any other means desired. In order to make the heating most effective a thermal insulating covering 13 is provided around the outer surface of the vessel, as is well known in the art.

While the invention has been described in terms of a cylindrical tank of circular cross-section, it can just as easily be applied to a rectangular tank for example in which the air manifold would be positioned along one wall of the tank and the plurality of arms would extend perpendicularly out of the manifold and would be spaced substantially equally apart, with the slots positioned immediately below the arms in the dividing wall. By this means, the rising columns of air bubbles and water bubbles such as 39 would rise parallel to each other, and the down travelling water would flow in the corresponding spaces between these upwardly rising columns. The illustration of this invention in terms of a radial system of slots and arms is purely for illustrative purposes, and does not limit the application of this invention.

The areas for downflow of water, in aggregate, should be at least 13 times the aggregate area of rising water plus air.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:
1. Apparatus for liquid aeration, comprising;
(a) a circular cylindrical vessel of selected height, with axis substantially vertical, and having a closed bottom and top;
(b) a horizontal dividing wall positioned a selected small distance above the bottom of said vessel, and means for entry of liquid into the space below said dividing wall;
(c) a plurality of spaced narrow slots of selected width in said dividing wall, through which water can flow upwardly in the form of vertical sheets of water from said first space into a second space above said dividing wall; said slots distributed substantially uniformly over the cross-sectional area of said vessel;
(d) air manifold means having a plurality of air pipes of selected small diameter, each pipe positioned vertically, coplanarly, above one of said slots, a selected distance, a plurality of small holes or orifices drilled in the under surface, on both sides of the centerline, of said pipes;
(e) baffle means near the top of said vessel for the separation of air from said liquid;
said baffle means closing off the entire cross-section of said vessel except for an annular passage at the wall of said vessel;
(f) upwardly directed air outlet pipe means at the center of the top closure of said vessel; and
(g) downwardly directed liquid outlet pipe means at the center of said baffle means;
whereby the air-liquid mixture flows upwardly through said annular passage and radially inwardly above said baffle means;
whereby the air and liquid separate and said air flows upwardly through said air outlet pipe, while said liquid flows downwardly through said liguid outlet pipe.

2. The apparatus as in claim 1 in which said slots are radial, and substantially circumferentially equally spaced, said air pipes are equal in number to said slots and are radial, and said air manifold is a cylinder at the axis of said vessel.

3. The apparatus as in claim 1 including means to heat the incoming liquid.

4. The apparatus as in claim 1 including means to simultaneously heat both the incoming air and the incoming liquid.

5. The apparatus as in claim 1 including means to thermally insulate said vessel.

6. The apparatus as in claim 1 in which there are at least four orifices per air pipe, half on each side of the center line.

7. The apparatus as in claim 1 in which there are at least 50 orifices per air pipe, half on each side of the center line.

8. The apparatus as in claim 1 in which the total orifices in each air pipe are within an area of less than 18% of the total surface area of each pipe.

9. The apparatus as in claim 1 in which the cross-sectional area of said air manifold means is at least 1% of the cross-sectional area of said vessel.

10. The apparatus of claim 1 in which there are at least 100 orifices in each of said air pipes, half on each side of the center line.

11. The apparatus of claim 1 where said orifices in said air pipes have their axes, on each side of such air pipes, inclined at not more than 33° on each side of the vertical center line, at the downward surface.

12. The apparatus of claim 1 where said orifices in said air pipes have their axes, on each side of such air pipes, inclined at not more than 60° on each side of the vertical center line, at the downward surface.

* * * * *